(12) United States Patent
Mead et al.

(10) Patent No.: US 7,409,294 B2
(45) Date of Patent: Aug. 5, 2008

(54) TRAFFIC ALERT POLICE RADAR

(75) Inventors: Alan B. Mead, Allen, TX (US); John L. Aker, Kansas City, MO (US); Robert S. Gammenthaler, Princeton, TX (US); James Kevin McCoy, Garland, TX (US)

(73) Assignee: Applied Concepts, Inc., Plano, TX (US)

( * ) Notice: Subject to any disclaimer, the term of this patent is extended or adjusted under 35 U.S.C. 154(b) by 545 days.

(21) Appl. No.: 10/688,472

(22) Filed: Oct. 17, 2003

(65) Prior Publication Data

US 2005/0090982 A1    Apr. 28, 2005

(51) Int. Cl.
    *G08G 1/00*    (2006.01)
(52) U.S. Cl. .................. 701/301; 342/104; 342/107; 342/109; 340/902; 340/465; 340/466; 340/988; 340/425.5; 180/170
(58) Field of Classification Search .............. 701/301, 701/48, 96; 340/435, 902, 465, 466, 988, 340/425.5, 436; 342/70, 71, 104, 196, 114, 342/109, 107; 180/170, 282; *G08G 1/00*
See application file for complete search history.

(56) References Cited

U.S. PATENT DOCUMENTS

| | | | |
|---|---|---|---|
| 3,680,085 A | 7/1972 | Del Signore | |
| 3,760,414 A | 9/1973 | Nicolson | |
| 4,003,049 A | 1/1977 | Sterzer et al. | |
| 4,052,722 A | 10/1977 | Millard | |
| 4,072,945 A | 2/1978 | Katsumata et al. | |
| 4,214,243 A | 7/1980 | Patterson | |
| 4,219,878 A | 8/1980 | Goodson et al. | |
| 4,335,383 A * | 6/1982 | Berry | 342/115 |
| 4,673,937 A | 6/1987 | Davis | |
| 4,740,045 A | 4/1988 | Goodson et al. | |
| 5,289,181 A * | 2/1994 | Watanabe et al. | 340/902 |
| 5,307,060 A * | 4/1994 | Prevulsky et al. | 340/902 |
| 5,525,996 A | 6/1996 | Aker et al. | |
| 5,528,246 A | 6/1996 | Henderson et al. | |
| 5,563,603 A | 10/1996 | Aker et al. | |
| 5,570,093 A | 10/1996 | Aker et al. | |

(Continued)

OTHER PUBLICATIONS

Westphal, R; Kessler, A, "35-GHz-Doppler radar for law enforcement agencies in Europe", Microwave Symposium Digest, 1988, IEEE MTT-S International May 25-27, 1988 pp. 1031-1033 vol. 2.*

(Continued)

*Primary Examiner*—Tuan C To
(74) *Attorney, Agent, or Firm*—Scott T. Griggs; Griggs Bergen LLP

(57) ABSTRACT

An enhanced police Doppler direction sensing radar detects possibly dangerous traffic conditions during certain vehicle maneuvers such as U-turns and returns to travel after roadside stops. By monitoring a host or primary vehicle speed, speed transitions, transmission state (e.g. gear selection), and the closing vehicle position, range and speed, a number of selectable conditions are detected, resulting in an alert indication to a primary vehicle operator. User preferences and thresholds allow the traffic alert function to be customized according to a primary vehicle operator's desire to suppress alerts in situations which the user does not deem dangerous. The traffic alert function may be automatically triggered under certain detected conditions, or manually initiated when the primary vehicle operator intends to make a driving maneuver.

8 Claims, 12 Drawing Sheets

U.S. PATENT DOCUMENTS

| | | | |
|---|---|---|---|
| 5,691,724 A | 11/1997 | Aker et al. | |
| 5,917,430 A * | 6/1999 | Greneker et al. | 340/905 |
| 6,008,752 A | 12/1999 | Husk et al. | |
| 6,087,961 A * | 7/2000 | Markow | 340/902 |
| 6,198,427 B1 | 3/2001 | Aker et al. | |
| 6,266,627 B1 | 7/2001 | Gatsonides | |
| 6,369,747 B1 * | 4/2002 | Ashihara | 342/70 |
| 6,400,304 B1 * | 6/2002 | Chubbs, III | 342/20 |
| 6,417,796 B1 | 7/2002 | Bowlds | |
| 6,462,702 B1 * | 10/2002 | Bowlds | 342/104 |
| 6,501,418 B1 | 12/2002 | Aker | |
| 6,529,831 B1 * | 3/2003 | Smith et al. | 701/301 |
| 6,580,386 B1 | 6/2003 | Aker et al. | |
| 6,614,362 B2 * | 9/2003 | Siegel | 340/902 |
| 6,646,591 B2 | 11/2003 | Aker et al. | |
| 6,798,374 B1 * | 9/2004 | Smith | 342/109 |
| 7,188,026 B2 * | 3/2007 | Tzamaloukas | 701/200 |
| 2001/0038344 A1 * | 11/2001 | Garcia | 340/902 |
| 2001/0054976 A1 * | 12/2001 | Sauer | 342/70 |
| 2002/0014988 A1 * | 2/2002 | Samukawa et al. | 342/70 |
| 2002/0032515 A1 * | 3/2002 | Nakamura et al. | 701/96 |
| 2002/0080062 A1 | 6/2002 | Aker et al. | |
| 2002/0089443 A1 * | 7/2002 | Jones | 342/104 |
| 2002/0102961 A1 * | 8/2002 | Gibbons et al. | 455/404 |
| 2002/0117340 A1 | 8/2002 | Stettner | |
| 2002/0198660 A1 * | 12/2002 | Lutter et al. | 701/301 |

OTHER PUBLICATIONS

Skolnik, Merrill I. "Introduction to Radar Systems," 1962, McGraw-Hill Book Company, Inc., New York.

* cited by examiner

TRAFFIC ALERT POLICE RADAR

CROSS-REFERENCE TO RELATED APPLICATIONS (CLAIMING BENEFIT UNDER 35 U.S.C. 120)

Not applicable.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

None.

BACKGROUND OF THE INVENTION

1. Field of the Invention

This invention pertains to technologies for alerting a vehicle operator potentially hazardous traffic conditions prior to or during certain common driving maneuvers, such as interception U-turns, and pulling into moving traffic from a roadside.

2. Description of the Related Art

There are many types of vehicles which, during the routine course of their operation, are exposed to hazardous traffic conditions. Police cruisers and highway patrol vehicles often must re-enter moving traffic from a roadway shoulder after detaining another vehicle, or when intercepting a vehicle for speeding or another violation. Law enforcement vehicles operating on divided highways and boulevards often make U-turns to intercept a vehicle traveling in the opposing lanes, or to respond to a dispatch call.

However, law enforcement vehicles are by no means the only type of vehicle which routinely must operate in hazardous traffic conditions. For example, another emergency vehicle such as an ambulance or fire truck may also have to return to the roadway from a stopped position on the shoulder (e.g. after completing a call to an injury, wreck, or fire), or may have to make a U-turn to respond to a fire call or medical emergency.

Non-emergency vehicles also may have to make similar maneuvers, such as a construction or street maintenance vehicle, or a utility vehicle (e.g. telephone, electrical, water, sewage or natural gas service truck or van, or school bus). When completing a job or when attempting to arrive at a place for a job near or on a roadway, these types of non-emergency vehicles may be exposed to the same traffic hazards as a police vehicle, ambulance, or fire truck.

Therefore, the following description of certain hazardous situations applies equally well to all of these types of vehicles, and not just to police and highway patrol vehicles. For the remainder of this disclosure, we utilize the term "primary vehicle" to refer to any vehicle which is subjected to a potentially hazardous traffic condition, such as a police or trooper vehicle, or alternatively another emergency or non-emergency vehicle as previously described. Additionally, we employ the term "secondary vehicle" as a vehicle which may be involved in a particular scenario, the position and condition of which the operator of the primary vehicle is aware, such as a vehicle a patrolman has detained alongside a road, or a vehicle which an ambulance or fire truck is servicing. Further, we will refer to other vehicles which pose a potential danger to the primary vehicle as a "closing vehicle", such as a vehicle which is moving in a lane of traffic in which the primary vehicle is entering, and especially of which the operator of the primary vehicle may not be aware.

Police cruisers and highway patrol vehicles are generally supplied with several types of equipment, including an enhanced engine, suspension, and braking systems, as well as voice and data communication equipment. Such vehicles are also equipped with a variety of rotating beacons, strobe lights, and LED warning indicators, which, when used separately or in conjunction with a siren, can provide warning to other motorists of the patrol vehicle's status and position. Many law enforcement vehicles are also equipped with radar guns which can determine the speed of a target vehicle in traffic, mainly for the purposes of enforcing roadway speed limits. While these types of devices are useful in many applications of law enforcement, they provide inadequate safety to the officers operating the patrol vehicle in certain scenarios.

For example, in one common law enforcement scenario (10) as shown in FIG. 1, a trooper vehicle T is traveling in a first direction at an initial position (14) on a lane (12) of a divided highway, wherein the divided highway also has a median (13) and an opposing traffic lane (11).

Initially, the trooper may be measuring the speeds of vehicles in the opposing traffic lane (11), using a police radar unit, such as determining the speed of vehicle A in an initial position (15) in front of the trooper vehicle T in its initial position (14). At this point, the police radar unit has a line-of-sight (17) from the trooper vehicle T to the vehicle A.

When the trooper decides to intercept vehicle A, he must make a U-turn maneuver (18) through the median (13), falling into a pursuit position (14') traveling in the opposing lane (11) behind vehicle A, which has now moved to position A (15').

However, if another vehicle B is also traveling (16) in the opposing lane (11) at the time of the trooper's U-turn maneuver (18), there may be a danger of a collision with the trooper's vehicle. Vehicle B may not be initially visible when the trooper turns due to poor roadway lighting, inclement weather, or another visual impediment. As the trooper must slow his speed during the U-turn, and regain highway speed following the U-turn, vehicle B may be closing on the trooper vehicle at a considerably faster speed. If the trooper is operating the emergency lights (e.g. strobes, beacons, etc.) or the siren, the operator of vehicle B may be alerted to the danger of collision with the trooper, but the trooper is provided no warning of the potential collision.

In this particular scenario, the trooper vehicle T represents a primary vehicle, the intercepted vehicle A represents a secondary vehicle, and the vehicle B with which a collision danger exists is the closing vehicle. In alternate versions of this scenario, the primary vehicle may be a fire truck, ambulance, utility van, school bus or maintenance truck. Even though there may not be an intercepted vehicle in such a variation of this scenario, there certainly can be a closing vehicle which presents a collision danger when the primary vehicle is making a U-turn.

In another common law enforcement scenario (20) as illustrated by FIG. 2, a trooper vehicle T (24) is initially stopped (24) alongside (21) a roadway (22), sometimes with a detained vehicle A, which is also stopped (25). Alternatively, the trooper vehicle T may not be accompanied by a detained vehicle A, such as the case when a trooper is "speed trapping" or investigating a situation to the side of the road.

As the trooper's transaction with the detained vehicle is completed, or when the trooper decides to return to patrol, he executes a driving maneuver (23) to return to the roadway (22) by pulling into the closest lane of traffic, such as by driving into position (24'). However, there may be another vehicle B traveling (26) in this same lane, approaching the trooper's position (24'). As the trooper is in transition from being stopped to achieving highway speed, the speed difference between the other-vehicle B and the trooper's vehicle T may be great, thereby increasing the danger of a collision. As with the previously described scenario, the trooper's vehicle's emergency lights, if engaged, may provide some warning to the operator of the other vehicle B, but do not warn the trooper of the impending danger.

In this second scenario, the trooper vehicle T again represents a primary vehicle, the detained vehicle, if any, represents a secondary vehicle, and the vehicle with which a collision potential exists represents the closing vehicle. In other scenarios such as this, a fire truck, ambulance, utility van, or maintenance truck may represent the primary vehicle.

Therefore, there is a need in the art for a system and method which provides detection of such possibly dangerous traffic conditions, and which provides an alerting function to a vehicle operator.

SUMMARY OF THE INVENTION

The present invention provides a detection and alerting system for the operator of a primary vehicle, preferably in conjunction with a Doppler Direction Sensing Radar ("DDSR"), and alternatively with other types of radar such as a pulsed time-of-flight radar or pulsed Doppler radar. Parameters regarding the state of a primary vehicle, such as speed and gear, as well as parameters regarding the status of a closing vehicle are determined using DDSR functionality. A logical process then determines if a dangerous condition may exist, as defined by one or more user preferences.

If the predetermined thresholds or conditions are found to exist, an alert such as an audible tone and/or a visual indicator is issued to the primary vehicle operator. By allowing a user to set various thresholds and preferences, the system can be inhibited from issuing alerts except for conditions which the operator considers to be dangerous. Such user preferences may include, but are not limited to, difference of primary vehicle and closing vehicle speeds, minimum distance from primary vehicle to closing vehicle, minimum time to collision, and automatic triggering methods and thresholds. Manual triggering of the traffic alert functionality is also provided in order to allow an officer to start a check for potentially dangerous traffic prior to executing or during a traffic maneuver.

The invention enhances safety for law enforcement officers during routine traffic maneuvers, while simultaneously allowing a common user interface (e.g. the radar gun controls and display) to be used by the officer, thereby minimizing training and learning requirements. Additionally, by integrating into typical DDSR units, the present invention can be provided at an attractive cost to public safety departments, and can be installed in a vehicle without additional equipment weight or power consumption.

As many jurisdictional agencies such as city, county, state and federal governments, often operate other, non-emergency vehicles in their fleets, there exists an economic advantage to considering equipping these other non-emergency vehicles with the traffic alert system, even though those vehicles do not need the equipment for other law enforcement purposes. For example, by purchasing enough traffic alert systems to equip a municipal police force as well as all street maintenance vehicles, city fire vehicles, and ambulances, the safety of the operation of all these vehicles can be enhanced. Use of the same equipment on all of these vehicles allows the city to realize economic and efficiency advantages due to common installation, maintenance, and training.

DETAILED DESCRIPTION OF THE INVENTION

The present invention is preferably realized as a functional enhancement to a police Doppler Direction Sensing Radar. The present invention may be embodied as software, hardware, or a combination of software and hardware. As such, we first present information regarding such DDSR units. Additionally, we will provide certain examples of usage of the present invention with respect to law enforcement vehicles, which we will collectively refer to as "trooper vehicles". However, usage of the present invention is not limited to law enforcement vehicles, but also includes all types of vehicles which may benefit from improved safety during operation such as other emergency vehicles and non-emergency vehicles.

Enhanced Safety Scenarios using Our Traffic Alert System

Figure 1:
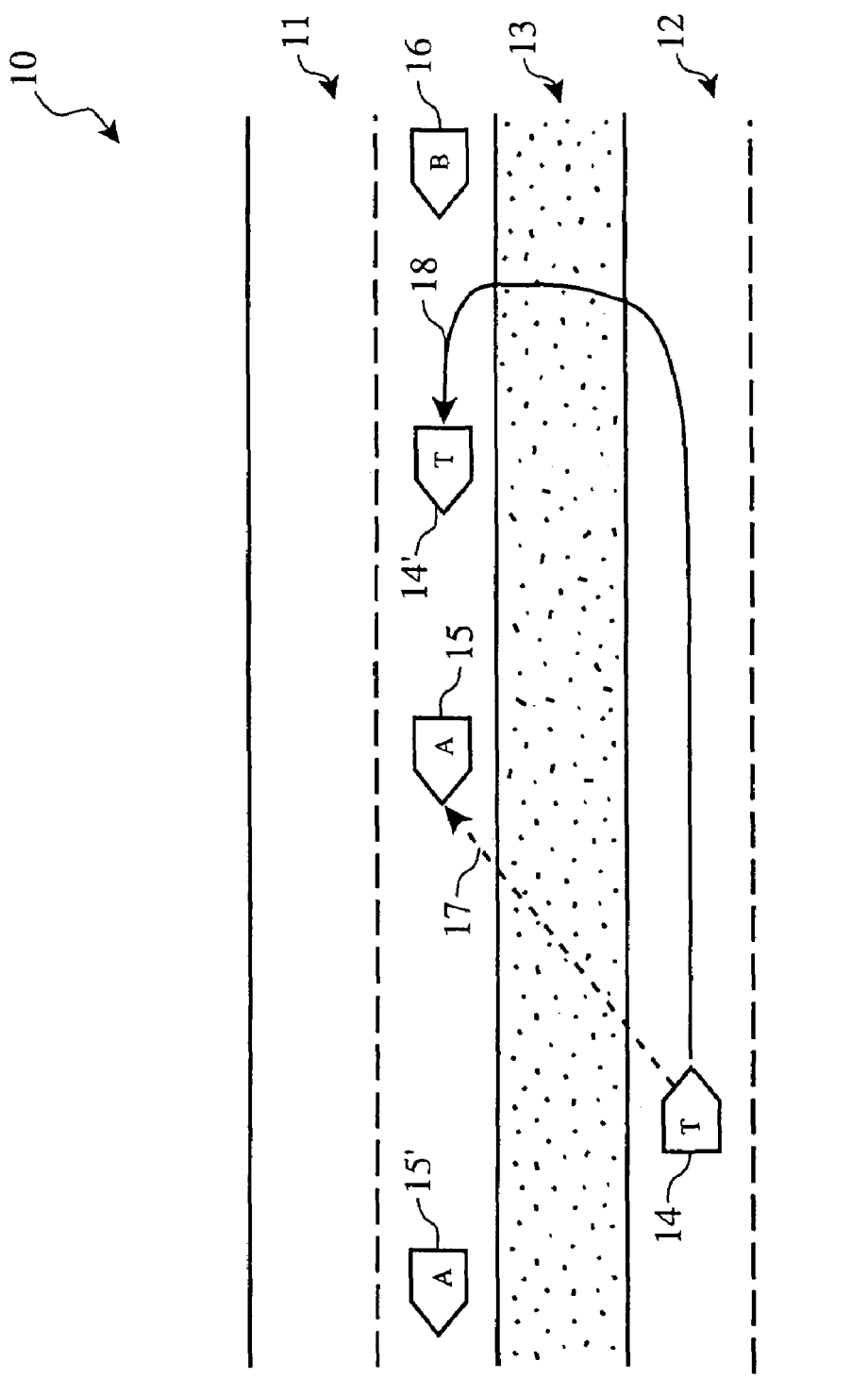
FIG. 1 illustrates a common U-turn maneuver.
Figure 3:
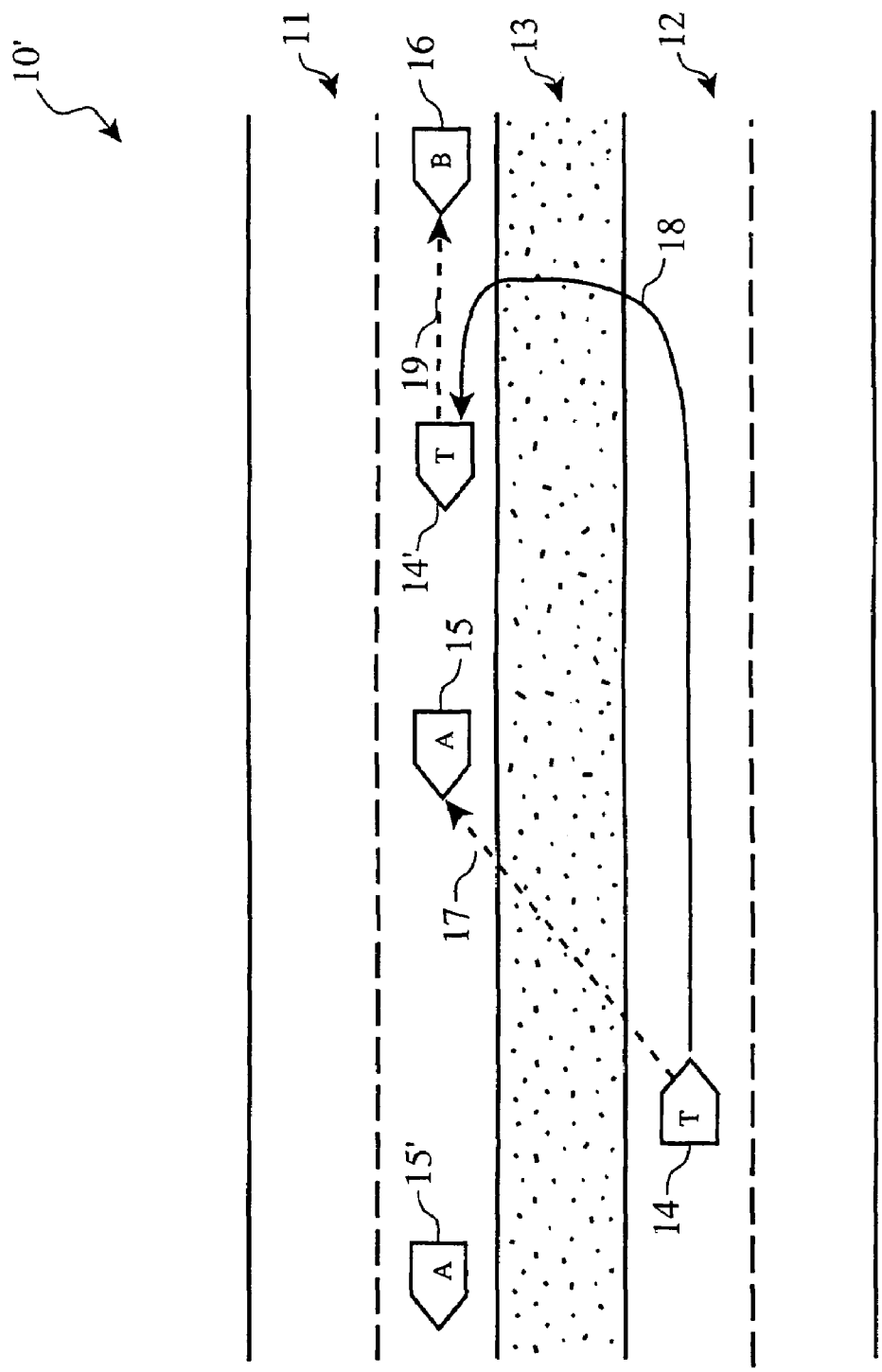
FIG. 3 shows an improved scenario during U-turn maneuvers according to the present invention.

Turning to FIG. 3 and revisiting the dangerous traffic scenario (10) discussed in conjunction with FIG. 1, our enhanced DDSR with Traffic Alert function uses the rear looking radar capabilities of the DDSR to help detect (19) potentially dangerous oncoming traffic conditions following a U-turn maneuver (18). The enhanced scenario (10') shown in FIG. 3 provides greater safety to the officer or operator of a primary vehicle equipped with our Traffic Alert System.

For example, in this improved scenario, the Traffic Alert system determines parameters regarding the operation of the primary vehicle (e.g. a trooper vehicle or other vehicle) such as speed variations indicating the execution of a U-turn maneuver. Such speed variations can be determined and tracked by use of a primary vehicle speed sensing ("VSS") function within the police radar unit, by input from the speedometer of the primary vehicle, or both.

The Traffic Alert system also determines certain parameters regarding the state of a closing vehicle B, and then determines if a potentially dangerous situation exists according to the user's preferences and thresholds (e.g. is there enough time to avoid collision, is the closing vehicle approaching too fast, etc.). If so, an alert is issued to the operator of the primary vehicle, such as a beep or tone, visual indicator, or both. This alert may allow the operator of the primary vehicle to take evasive action to avoid the collision, such as pulling back onto the shoulder or median of the road, or changing lanes.

Figure 2:
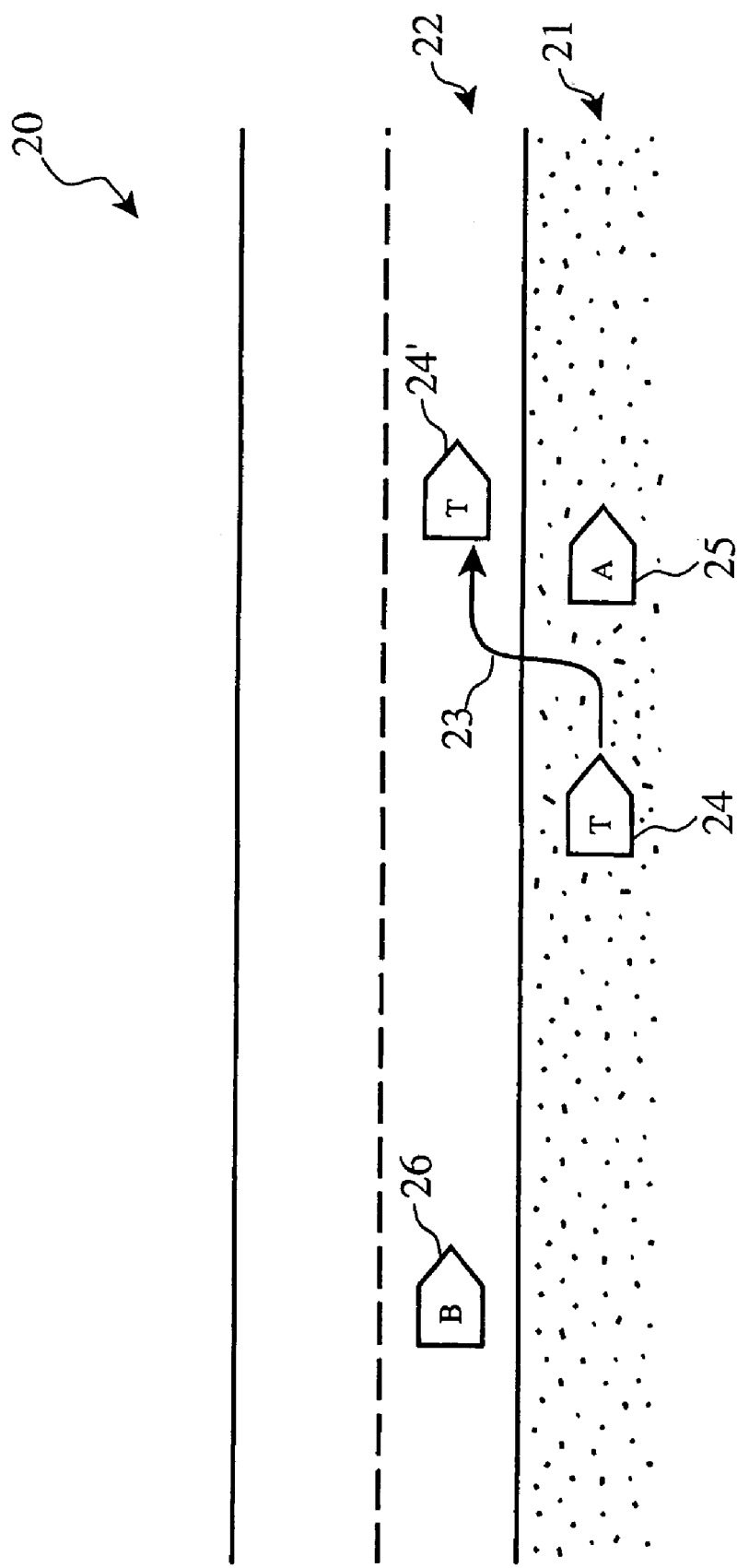
FIG. 2 illustrates a common maneuver performed when a vehicle returns to traffic following a standing period at the side of a road.
Figure 4:
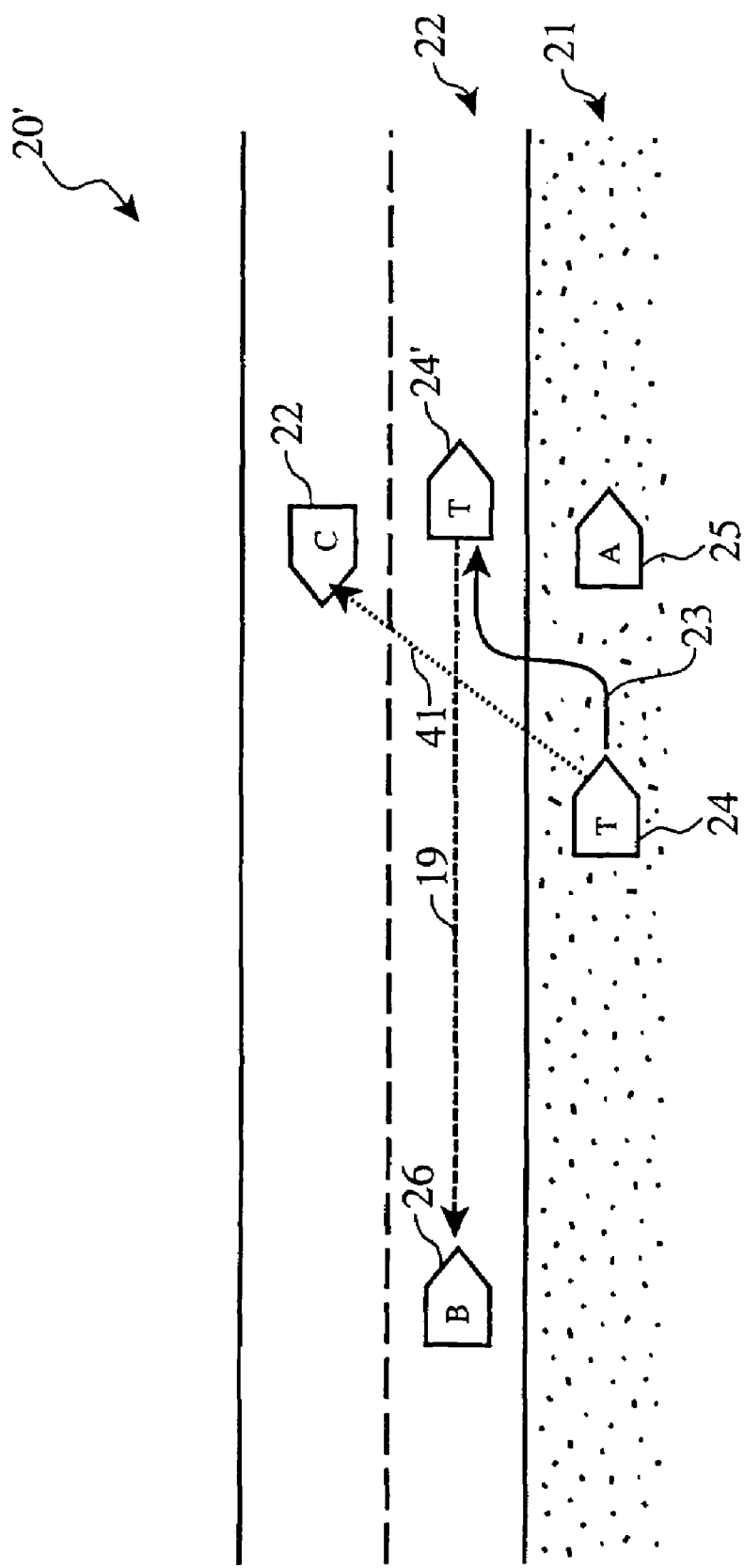
FIG. 4 shows the improved scenario during maneuvers to return to patrol or the roadway after being stopped, according to the present invention.

Now turning to FIG. 4 and revisiting the dangerous traffic scenario discussed in conjunction with FIG. 2, the rear looking radar capabilities of the DDSR are utilized to help detect (19) potentially dangerous oncoming traffic conditions prior to or following a maneuver (23) to return to the roadway following a roadside stop or when returning to patrol. The scenario (20') shown in FIG. 4 provides greater safety to the operator of the primary vehicle by detecting certain parameters with respect to the state of the primary vehicle T, such as transitioning from a stopped state to a moving state using the speed sensing capabilities of the police radar unit, and by determining certain parameters with respect to the state of the closing vehicle B, such as its speed, distance, time to collision, etc.

Then, the Traffic Alert system determines if any of the preferences or thresholds set by the user are met or exceeded, such as minimum time to collision or maximum speed difference between the primary vehicle and the closing vehicle. If any of these preferences or thresholds are met or exceeded, an alert is issued to the operator of the primary vehicle to enable evasive action.

DDSR Platform

Figure 5:
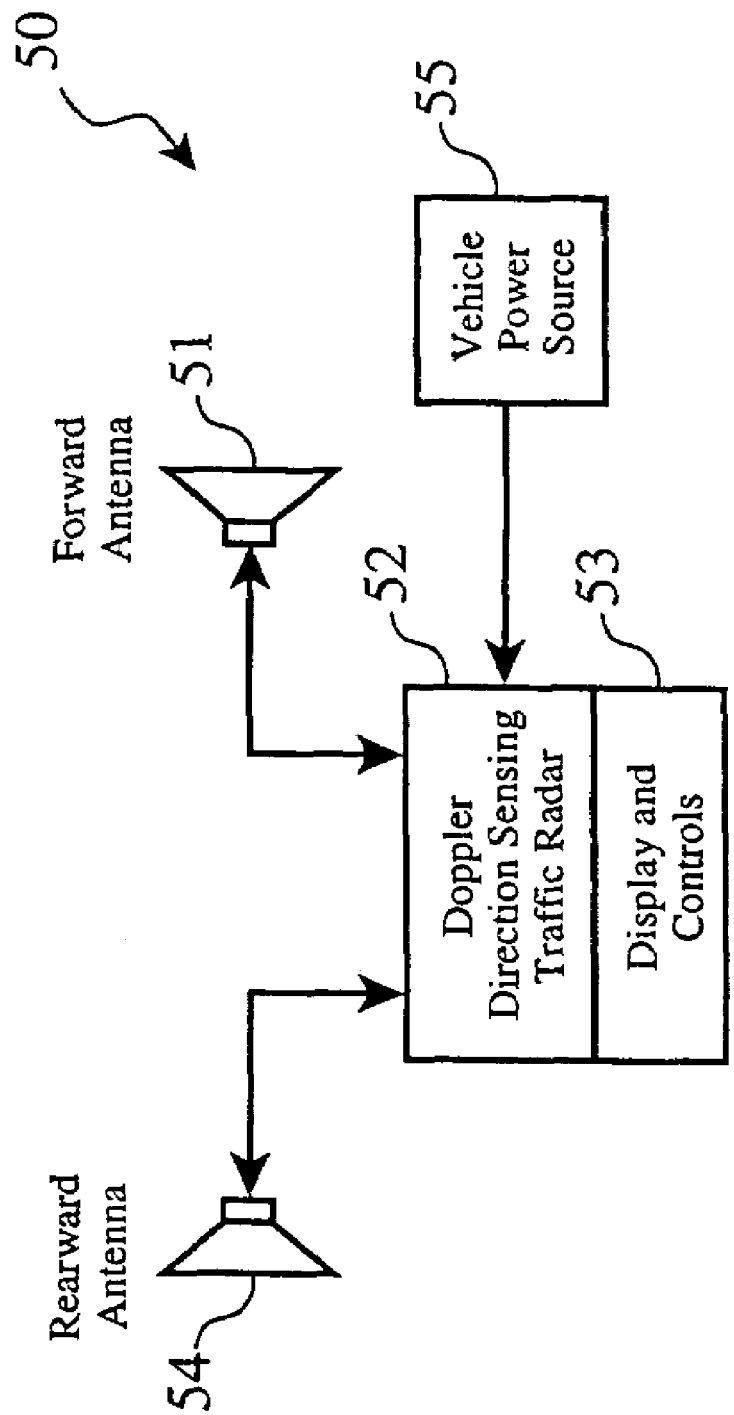
FIG. 5 illustrates the general organization of a police Doppler Direction Sensing Radar unit.

FIG. 5 illustrates a high-level block diagram (50) of a typical Doppler Direction Sensing Traffic Radar. A typical DDSR includes a power source (55), such as the vehicle-battery or generator, a forward looking antenna (51), a rearward looking antenna (54), a radar core unit (52), and a set of displays (e.g. LCD panel, LED digits, indicators, annunciators, etc.) and controls (e.g. touch-screen panel, switches, knobs, etc) (53).

The directional antennas (51, 54) transmit radar energy in front of and behind, respectively, the trooper vehicle, such that the energy may be reflected back to the trooper vehicle by vehicles in front of or behind the trooper vehicle. Changes in return signal amplitude, frequency (e.g. Doppler shift), and time for energy return are used to determine a target vehicle's speed and direction, which is displayed by the DDSR.

Figure 6:
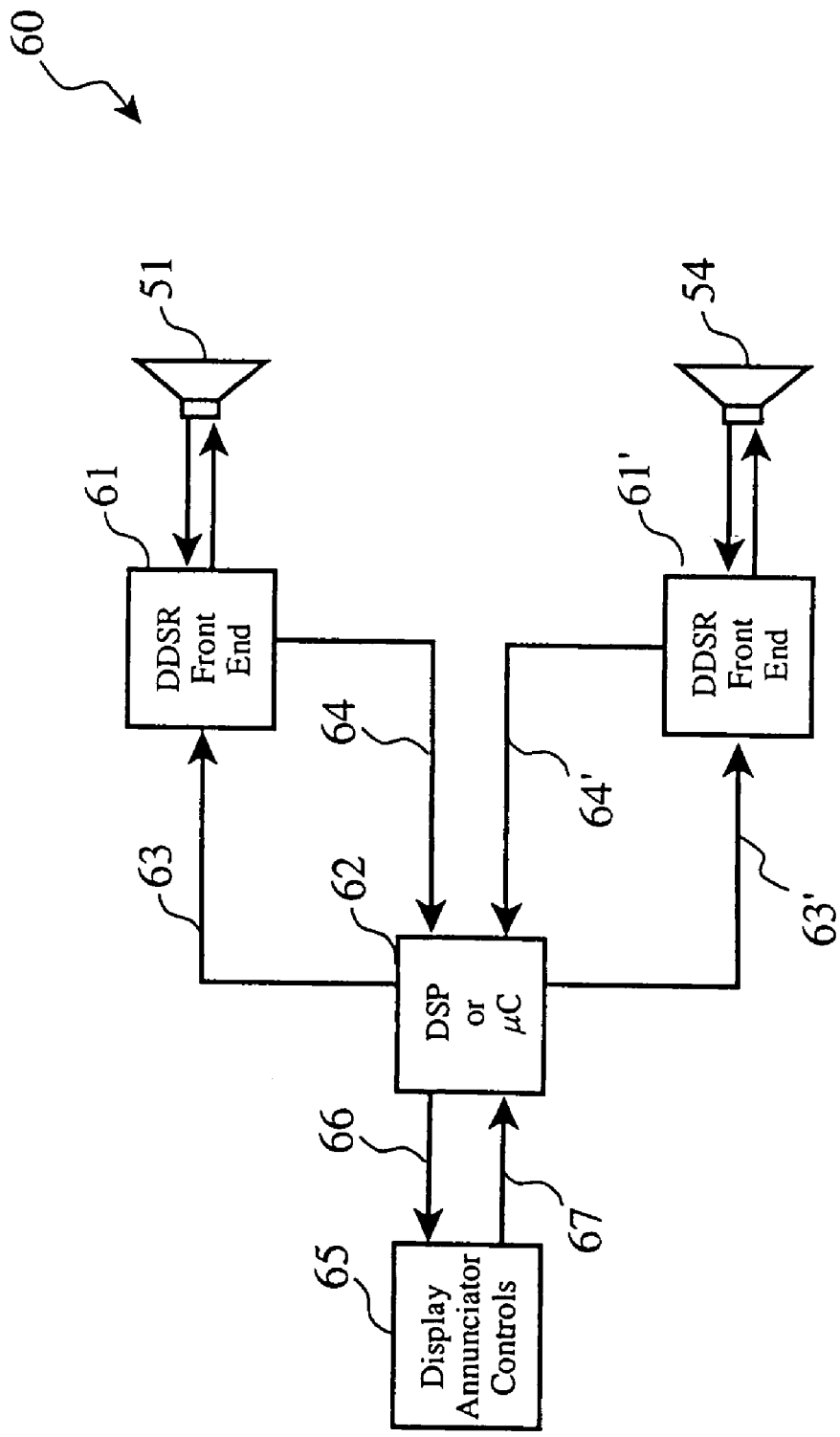
FIG. 6 provides a more detailed perspective of a police DDSR unit.

FIG. 6 provides a more detailed view (60) of such a typical DDSR unit, including one or two radar front end circuits (61, 61') and antennas (51, 54), a microprocessor or digital signal processor ("DSP") (62), and the user interface devices (65). The microprocessor or DSP (62) executes one or more firmware and software functions to receive radar data (64, 64') from the front ends, to control the transmission characteristics of the front ends (63, 63'), to perform Fast Fourier Transforms ("FFT") calculations, to determine if certain logical conditions exist, to execute other methods and processes, to produce visible and audible user alerts and indications (66), and receive user selections, preferences and controls (67).

While DDSR units such as these are employed in our preferred embodiment or in conjunction, the present invention may be realized in association and cooperation with other suitable DDSR units, as well.

Primary Vehicle Speed Sensing or Estimation

If the speed of a trooper vehicle or other primary vehicle is ascertainable, then the police radar can be used not only while the trooper vehicle is standing still, but also while it is in motion. Generally speaking, if a police radar unit is equipped with the capability of determining the speed of the trooper vehicle in which it is traveling, it can accurately determine the relative speed of a closing vehicle, and thus the absolute (real) speed of the closing vehicle. By determining the speed of the patrol unit, and adding or subtracting this value to the detected relative speed of a target vehicle (depending on the relative direction of the target vehicle), the actual speed of the target vehicle can be determined. This ability to determine the speed of the primary vehicle is useful to the present invention, as well, as the invention may examine the pattern of speed variations over time to determine if certain driving maneuvers are being executed such that a search for potentially dangerous closing vehicles should be performed.

Many methods for determining the speed of a vehicle or piece of equipment are well known in the art, such as the use of Global Positioning System information to determine rate of travel, or making inertial measurements to determine speed. In a simple method, a speedometer reading may be employed to determine speed of a vehicle in which a police radar unit is installed.

Some police radar units, however, use their own radar transmission and reception capabilities to sense the trooper vehicle speed, which then allows the unit to make speed measurements of target vehicles while the trooper vehicle is in motion.

In these existing police radars, the primary vehicle speed is determined by searching the Fourier components of the Doppler return signal for radar reflections from stationary objects such as billboards, trees, the ground, etc. Usually, the strongest signal component represented a return from the ground or another stationary object. However, that is not always true, and false patrol speed signals could be locked onto and tracked if another signal from, for example, a truck with a large radar cross section is the strongest signal in the spectrum. In other words, the fact that a radar return signal is the strongest signal in the spectrum does not guarantee that it is from a stationary object and represents the patrol speed.

To resolve that ambiguity, some of these radars use digital signal processing to examine the shape of the Fourier component spectrum around the peak which the radar thinks is the patrol speed return from a stationary object. Primary vehicle speed returns typically have an asymmetrical shape around the peak, and some other police radars take advantage of this fact by examining the shape of the spectrum around each peak which is suspected of being a primary vehicle speed return to determine if the characteristic asymmetric shape was present.

At least one method allows the police radar unit to self-calibrate itself with the assistance of input from the primary vehicle's speedometer, such as the system described in U.S. Pat. No. 6,501,418 entitled "Patrol Speed Acquisition in Police Doppler Radar" to Aker. In this system, speed pulses from the primary vehicle's speedometer are used to steer a search by a digital signal processor on a Fourier transform based police Doppler radar to find the correct patrol speed from stationary object returns. The system initially calibrates itself by finding the correct ratio between primary vehicle's speed sensor (e.g. speedometer) output frequency and true vehicle ground speed. By calibrating itself, it allows a portable police radar unit to be-moved easily from one car to another with different speed versus frequency characteristics of their speedometers. Alternatively, this system can skip or omit the self-calibration process, resorting to operation similar to other police radars to find the ground speed without any speedometer input at all.

Sensing Direction of a Closing Vehicle

Some DDSR units can determine the direction of a vehicle being monitored relative to the direction of travel of the trooper vehicle (e.g. same direction as patrol vehicle, opposite direction as patrol vehicle), as well as the lane of the vehicle being monitored (e.g. same lane, opposing lane). Methods for determining direction of a closing vehicle using radar signals are known in the art. The knowledge of the direction of a vehicle which is within view of the police radar unit is useful for the present invention in order to eliminate vehicles from consideration which are moving away from the primary vehicle, thus do not provide a collision danger to the primary vehicle.

One police radar unit which provides direction sensing is described in U.S. Pat. No. 6,198,427 entitled "Doppler Complex FFT Police Radar with Direction Sensing Capability", issued to Aker, et al. In this unit, a quadrature front end which mixes received RF with a local oscillator to generate two channels of doppler signals is employed, with one channel being shifted by an integer multiple of 90 degrees in phase relation to the other channel by shifting either the RF or the local oscillator signal being fed to one mixer but not the other. The two Doppler signals are digitized. The digital samples from each-channel are then processed by a digital signal processor using a complex FFT resulting in a receding target spectrum and an approaching target spectrum of Fourier components. This particular patent discloses several single mode radars detailing the manner of processing the two half spectra of receding and approaching targets to find either the strongest target alone or the fastest target alone in various stationary, moving same lane or moving opposite lane operation, and it also discloses a multimode digital FFT, direction sensing, doppler radar where the operator can select between the following modes of stationary, strongest only, receding only; stationary, strongest only, approaching only; stationary, strongest and fastest, approaching only; stationary, strongest and fastest, receding only; moving, same lane only, strongest only; moving, same lane only, strongest and fastest; moving, opposite lane only, strongest only; and moving, opposite lane only, strongest and fastest.

According to the disclosed fastest search methods, samples are collected which were digitized at a known gain level by virtue of using the DSP to control the gain of an amplifier, and the two amplifiers in the two channels. A strongest search is performed first, preferably, maintaining a record of some number of the strongest signals in the spectrum such that the fastest target candidates can be screened to eliminate false fastest targets. A further degree of refinement in the fastest target screening process is provided by using the controlled gain amplifiers to amplify the Doppler signals before they are digitized. By knowing the gain that was in effect as each batch of samples were gathered, it is possible to calculate the true power of any signal in the spectrum from its apparent or relative power and the gain that was in effect when the samples were collected. This allows fastest target candidates to be not rejected even if they are at a frequency that is a double or triple of the trooper vehicle speed or a strong signal if the trooper vehicle speed or strong signal does not have a true power that exceeds an experimentally determined harmonic generation threshold.

Likewise, a fastest candidate that has a frequency that happens to be at the sum of the frequencies of two strong signals need not be eliminated if the true powers of the two strong signals do not exceed power thresholds which are experimentally determined to be likely to cause intermodulation products to exist. This has the significant advantage that it does not blind the radar to legitimate fastest targets if the underlying strong signals are not strong enough to have caused harmonics or intermodulation products.

Even though this particular unit is employed in our preferred embodiment, it is also possible to employ other known methods of closing vehicle direction sensing for the purposes of achieving the present invention.

Estimating Range from Primary Vehicle to Closing Vehicle

Methods and circuits for estimating the range or distance from a primary vehicle to a closing vehicle are also well known in the art, and are provided by the DDSR platform in our preferred embodiment. In alternate embodiments, the addition of a ranging function to a unit may be required to realize certain aspects of the present invention. Having a range estimate is useful to the present invention such that the invention may determine a predicted time to impact with the primary vehicle. By using the range and speed of the closing vehicle, coupled with the speed of the trooper vehicle, a determination can be made of how long the operator of the primary vehicle has to react to the closing vehicle. If the time prediction exceeds a user-set preference, then the closing car may not be considered a danger and an alert may not be issued. Otherwise, an alert is made to allow the operator of the primary vehicle maximum chances to take evasive action.

Figure 12:
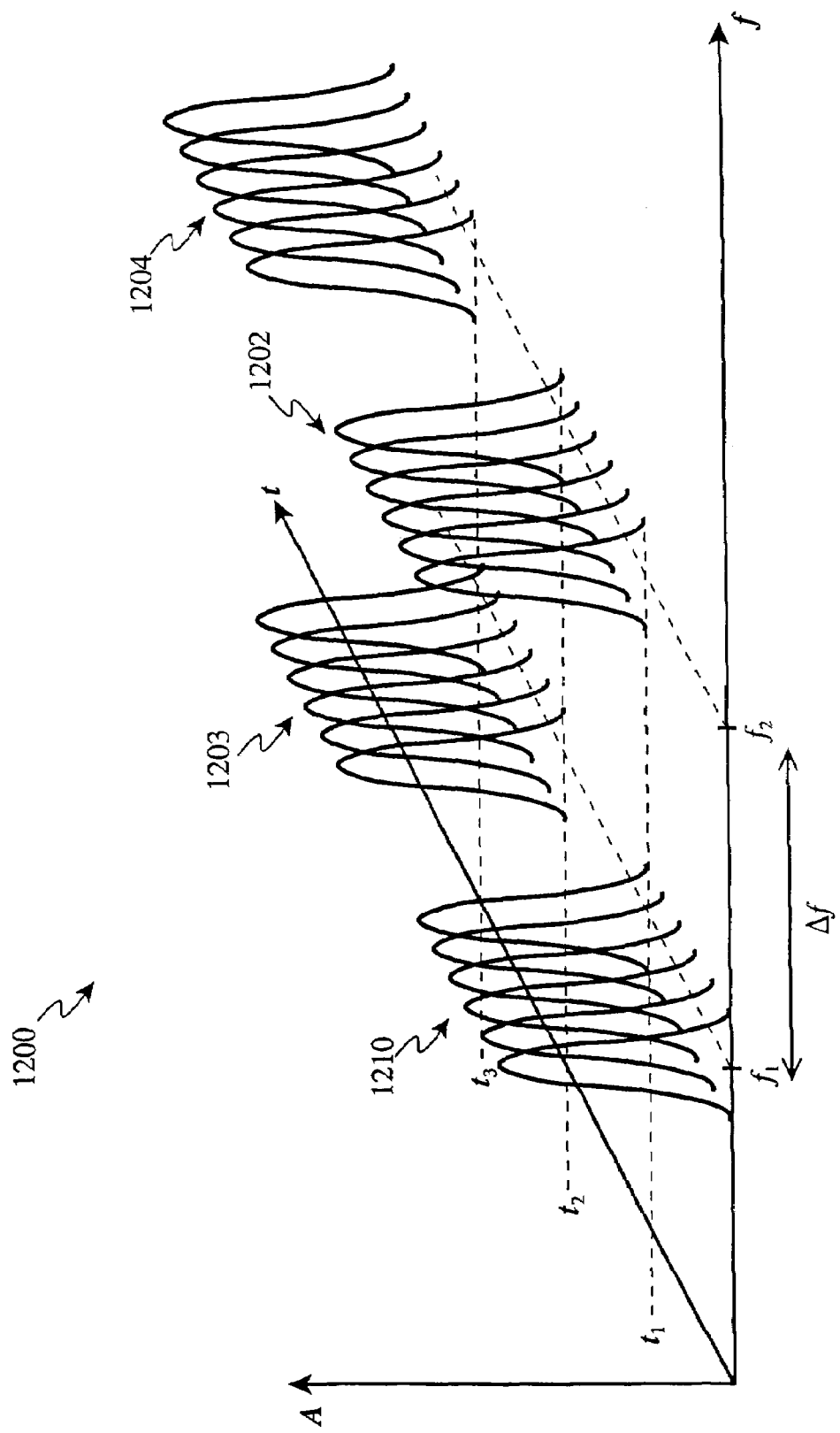
FIG. 12 shows a time-variant radar signal transmission frequency employed to provide range measurement from a primary vehicle to a closing vehicle.

A variety of ranging techniques are available in the art, such as that described in U.S. Pat. No. 4,740,045 entitled "Multiple Parameter Doppler Radar" to Goodson, et al. As a ranging function is highly beneficial, but not critical, to realization of the present invention, we turn to FIG. 12 to discuss one known ranging technique. The radar Doppler signal is continuously transmitted while its frequency is varied by $\Delta f$ between a first frequency $f_1$ and a second frequency $f_2$, such that the signal (1210, 1203, 1202, 1204) varies over time in two states, forming two signals which are reflected from a target to the DDSR unit.

For example, the radar signal frequency may be varied between 35.000 and 35.005 Ghz. The two reflected signals are down converted, and the Doppler components are recovered, using conventional means. Through a process of separation, filtering, and squaring, the approximate range to the target vehicle can be determined by measuring the magnitudes of the phase angle between the two recovered Doppler components.

A microprocessor or DSP control signal is employed by the software to vary the frequency of the radar signal transmission, a function which can alternately be performed by circuitry, as well. After determining the approximate range to the impending vehicle, the range value can be compared to a threshold value such as a user preference (e.g. minimum distance to vehicle alarm setting), and an alert can be issued if the threshold is met or exceeded.

Alternate, known techniques for ranging may be employed, as well, such as using return signal strength to estimate range. In our preferred embodiment of the invention, the resolution of the range needs only to be within several yards to allow for an approximate range determination, and subsequently for an approximate time to collision calculation.

Our Traffic Alert Function

As previously stated, the present invention is preferably realized as a software feature within a suitably configured microcontroller-based or digital signal processor-based police radar unit such as the aforementioned DDSR units.

Figure 11:
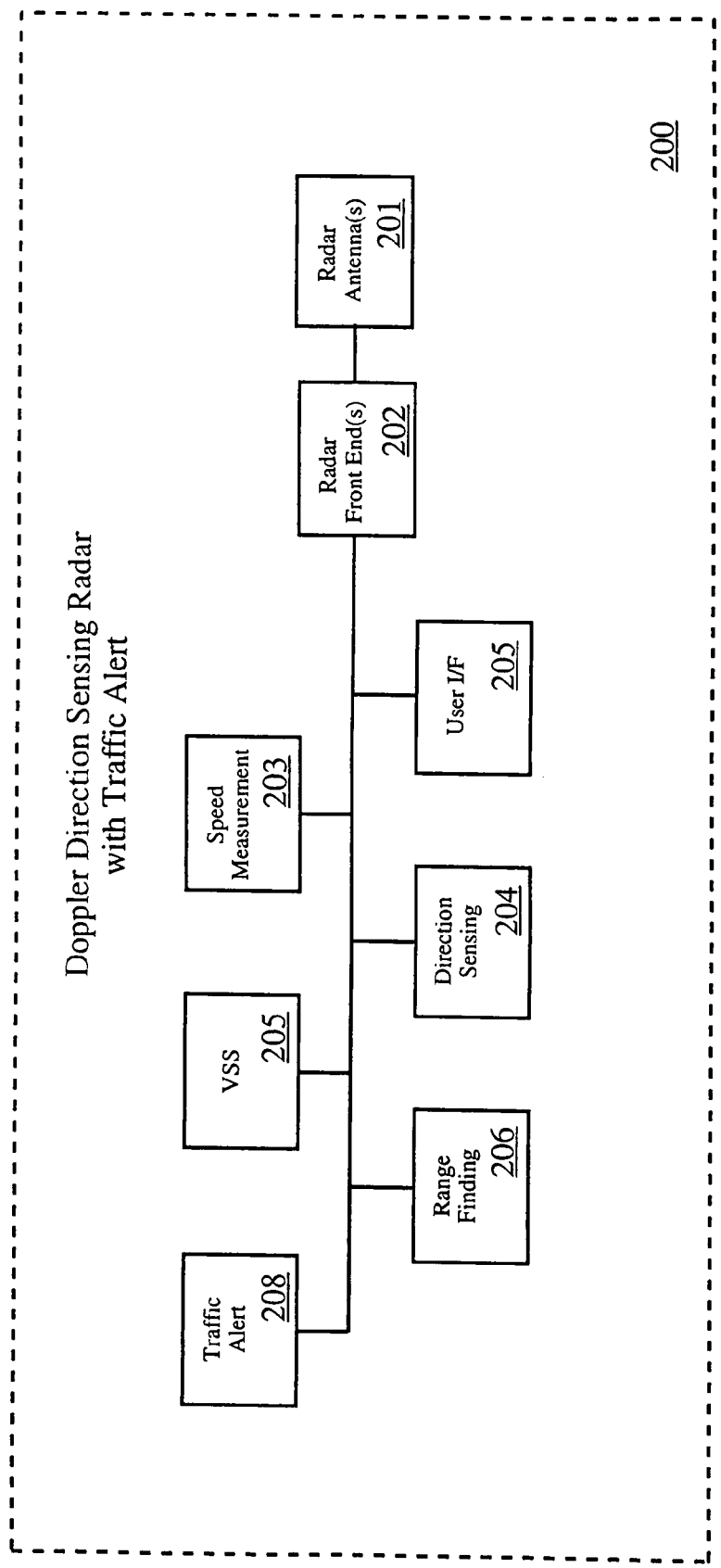
FIG. 11 provides an architectural illustration of a traffic alert system according to the present invention.

FIG. 11 provides an architectural block diagram representing an enhanced police Doppler Direction Sensing Radar unit (200), such as the one previously described, which includes at least one radar antenna (201), a radar front end (202), a user interface (205) for control and display, and a target vehicle speed determination function (203). Some of these functions may be implemented entirely in hardware circuitry, entirely in software functionality, or in a combination of hardware and software.

Further according to a preferred embodiment, the enhanced DDSR unit (200) has direction sensing functionality (204) to measure speeds of vehicles moving in the same direction of orientation of the law enforcement vehicle (e.g. a rear looking radar), and optionally has the capability to measure speeds of vehicles moving in the opposing direction of orientation of the law enforcement vehicle (e.g. forward looking radar).

Additionally, the preferred embodiment includes any or all of the advanced functions previously described, including a primary vehicle speed determination function ("VSS") (205), and target range finding function (206). Some of these functions may be implemented entirely in hardware circuitry, entirely in software functionality, or in a combination of hardware and software.

Further, the enhanced DDSR unit includes-certain logical processes for our Traffic Alert Function (208), preferably embodied in a firmware module which is executable by the microprocessor or DSP. Alternatively, the Traffic Alert Function may be realized in part or entirely in circuitry.

The logical processes of the present invention includes three phases:
(1) in the first phase, one or more parameters about the state of movement of the primary vehicle are determined and considered, which we will refer to as "preliminary conditions";
(2) in the second phase, one or more parameters about the state of movement of the closing vehicle are determined and considered, which we will refer to as "ancillary conditions"; and
(3) in the third phase, an alert is issued to the operator of the primary vehicle if the preliminary conditions and the ancillary conditions indicate that a potentially dangerous situation exists with respect to the primary and closing vehicles, in consideration of a number of user preferences and thresholds.

First Phase: Detecting Preliminary Conditions Preceding an Alert

The preferred embodiment of the present invention detects and considers most or all of the following logical and physical preliminary conditions which indicate a traffic alert detection should be performed. However, it will be readily recognized by those skilled in the art that not all of the following conditions must be detected to realize the present invention, but that a subset of these conditions may be employed in alternate embodiments.

Further according to our preferred embodiment, a set of user preferences are established which control which conditions and their thresholds are detected for each individual Traffic Alert unit, thereby allowing a primary vehicle operator to customize the alerting function for his or her risk perception.

Figure 7:
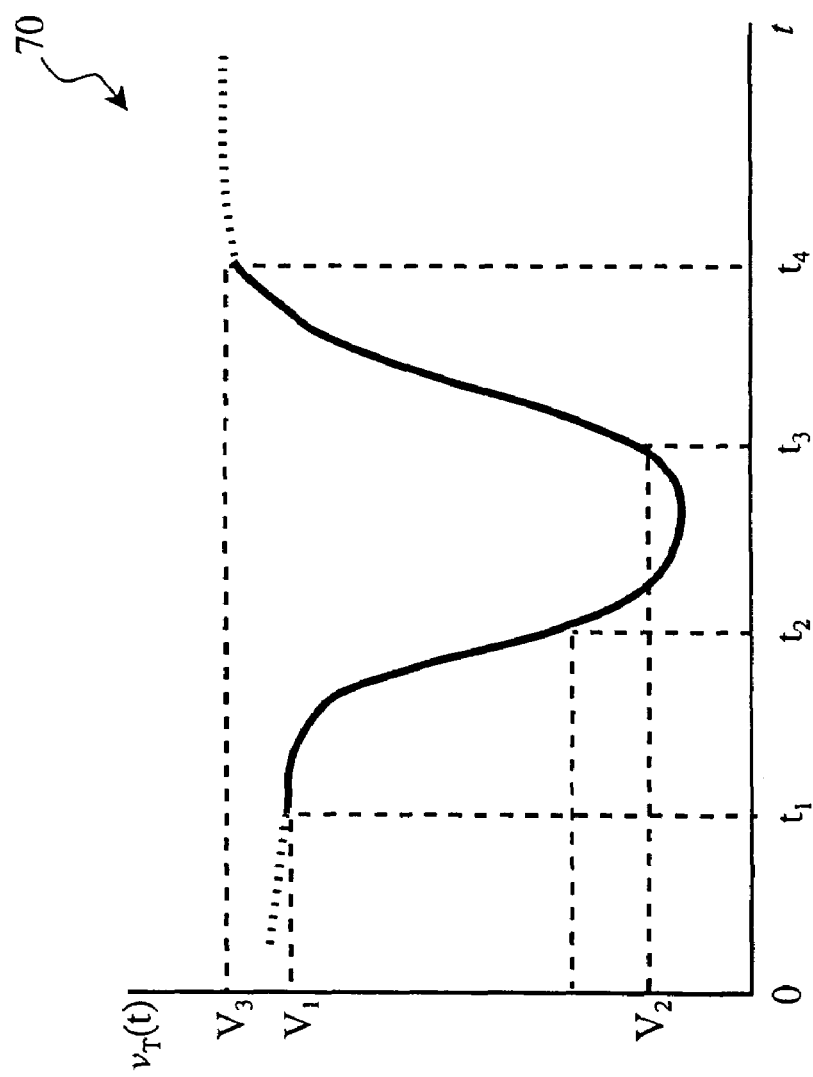
FIG. 7 depicts a profile of vehicle speed versus time during U-turn maneuvers, which is employed as a trigger condition according to the present invention.

In a U-turn maneuver scenario as previously described and illustrated in FIG. 3, the preliminary conditions include, but are not limited to:
(a) a relatively sudden slowing of a primary vehicle velocity $v_T(t)$ from an initial speed $V_1$, to a speed $V_2$, and subsequently rapidly accelerating or returning to a greater speed $V_3$, especially when the subsequent speed $V_3$ is much greater than the initial speed $V_1$ indicating the start of a pursuit, a speed pattern which is characteristic of a U-turn maneuver as shown in FIG. 7;
(b) the condition of the primary vehicle gear selector being in a "Drive" state during the velocity transitions, as shown in FIG. 7; or
(c) activation of a "traffic alert check" control by a user (e.g. manual triggering of the traffic alert function).

Figure 8:
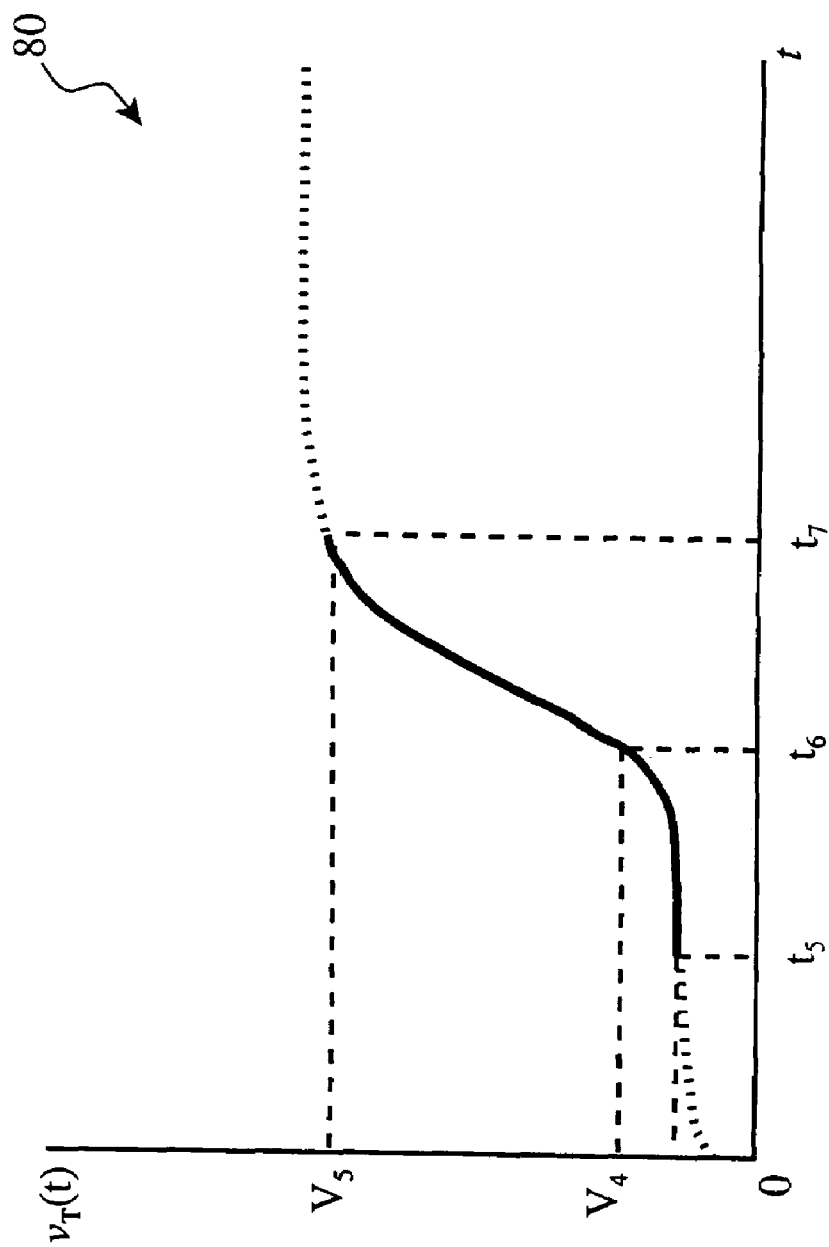
FIG. 8 depicts a profile of vehicle speed versus time during maneuvers to return to patrol after being stopped, which is employed as a trigger condition according to the present invention.

In a common scenario involving a maneuver to return to the roadway following a period of standing or slow driving alongside the roadway as previously described and illustrated in FIG. 4, the preliminary conditions include but are not limited to:
(d) an increase from a primary vehicle velocity $v_T(t)$ of initial speed $V_4$ which is stopped (or nearly stopped) at time $t_6$, followed by acceleration or reaching a subsequent speed $V_5$ at time $t_7$, indicative of a return to traffic speeds, as shown in FIG. 8;
(e) a change from a primary vehicle transmission setting of "Park" or "Neutral" at time $t_5$ to a setting of "Drive" at time $t_6$, indicative of returning to travel after a roadside stop or when beginning an interception of a vehicle traveling in the same direction as the primary vehicle;
(f) recent radar acquisition (41 as shown in FIG. 4) of secondary vehicle C in either direction relative to the primary vehicle within a specified recent period of time; or
(g) activation of a "traffic alert check" control by a user (e.g. manual triggering of the traffic alert function).

Primary vehicle speed changes may be detected by monitoring the speedometer of the primary vehicle, employing a Global Positioning System, monitoring an accelerometer unit, or using the previously described VSS function of a typical DDSR.

Changes in the transmission setting of the primary vehicle may be monitored via signal input from the primary vehicle's control computer or transmission controller, such as by input from a Controller Area Network ("CAN") automotive control bus.

Determination of whether or not a radar target has been acquired within a recent period of time can be made using software timing loops or hardware timers commonly found on microcontrollers and DSPs, combined with signal conditions of the radar front ends and results of the target vehicle speed, range, direction, return strength, etc., functions.

Manual triggering may be made by depressing a button on the DDSR control panel.

Figure 9:
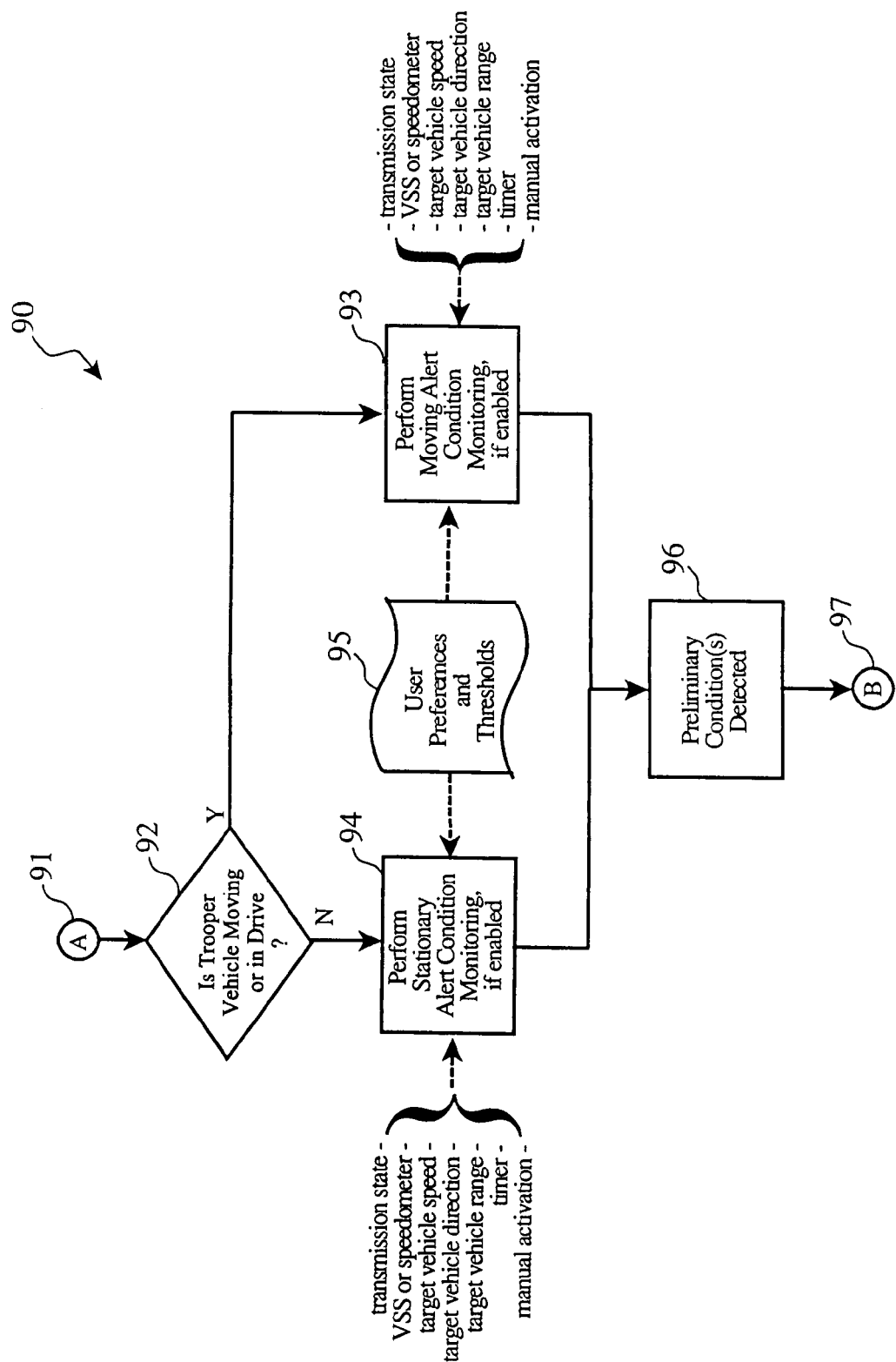
FIG. 9 shows one embodiment of a logical process for detecting preliminary alert conditions according to the present invention.

Turning to FIG. 9, one available embodiment (90) of a logical process according to the present invention for detecting the existence of one or more preliminary conditions is shown, which includes logic for both stationary and moving alerting modes. Alternate embodiments including stationary-only, moving-only, automatically-triggered only, and manually-triggered only processes may be realized through employing subsets of the steps shown. Choice of programming language and methodology can be made according to the target microprocessor or DSP of the DDSR which is to be enhanced with the invention.

The process starts (91) by determining (92) if the primary vehicle is moving or not (alternatively if it is in Park or Drive gear selection). If it is moving, then moving alert condition monitoring is performed (93), unless the user has disabled moving alert mode. If the primary vehicle is not moving, then stationary alert condition monitoring is performed (93), unless the user has disabled stationary alert mode.

When one or more stationary conditions are met (or exceeded) (96) according to the user preferences and threshold settings (95), processing proceeds (97) to ancillary condition consideration.

Second Phase: Detecting Ancillary Conditions Prior to an Alert

Before issuing a traffic alert indication to the operator of the primary vehicle, several other ancillary conditions are preferably determined and checked, either individually or in combination. However, as it will be readily recognized by those skilled in the art, not all of the following ancillary conditions must be detected to realize the present invention. Alternatively, a subset of the following conditions may be detected individually or in combination with others.

According to our preferred embodiment, additional user preferences are established which control the ancillary conditions and their thresholds. Our ancillary conditions include, but are not limited to:

(h) determination of the speed of the closing vehicle exceeding a maximum preferred real (e.g. absolute) speed;

(i) determination of the speed of the closing vehicle exceeding a maximum preferred speed relative to the primary vehicle speed (e.g. maximum allowable closing speed);

(j) determination of a distance to the closing vehicle from the primary vehicle position as being at or below a minimum preferred distance (e.g. a closeness threshold); and (k) determination that an estimated time to collision by the closing vehicle with the primary vehicle is below a minium preferred time for evasive maneuver by analyzing the estimated speed of the potentially dangerous-vehicle and its range to the trooper vehicle position (e.g. generally determining a closing speed by subtracting the speed of the trooper vehicle from the speed of the dangerous vehicle, and dividing the closing speed by the estimated range to the dangerous vehicle to yield a time-to-collision estimate).

Determination of the speed of the potentially dangerous vehicle is made in the customary manner by the usual DDSR functions, and this speed estimate is then compared by the new Traffic Alert function to a pre-determined threshold value.

Determination of the distance to the potentially dangerous vehicle is made using a typical radar ranging function and compared to a threshold value.

Determination of an approximate or estimated time to collision between the primary vehicle and the closing vehicle is made by dividing the difference of the closing vehicle speed and the primary vehicle speed by the approximate range to the closing vehicle, all calculations of course being scaled to compatible units of time and distance, and by comparing the distance value to a threshold value such as a user preference value (e.g. minimum time to collision alarm setting).

Figure 10:
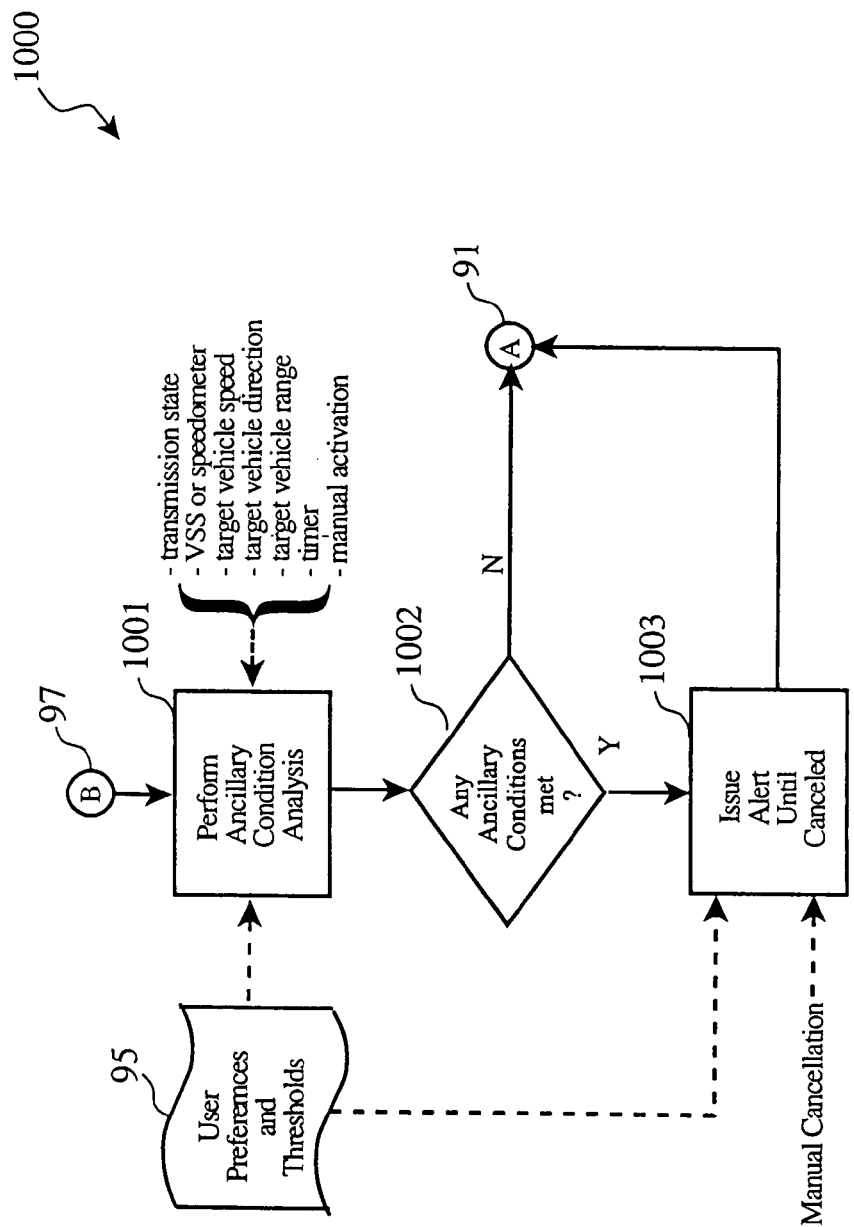
FIG. 10 shows one embodiment of a logical process for determining ancillary alert conditions according to the present invention.

An example embodiment (1000) of ancillary condition processing is shown in FIG. 10. Ancillary condition analysis (1001) is performed as previously described, and if (1002) any of the ancillary conditions or thresholds as set by the user preferences (95) are met (or exceeded), an alert is issued (1003) according to the user preferences (e.g. audible only, visible only, audible with visible, etc.).

Third Phase: Alerting the Operator of the Primary Vehicle

Upon determination that a traffic alert should be issued because at least one preliminary or trigger condition and at least one ancillary condition have been detected, the enhanced DDSR alerts the driver in one or more of the following manners:

(1) issues an audible alert such as a beep, buzz, chime, or voice warning through the annunciator of the DDSR;

(2) issues a visible alert such as an illuminated indicator, a flashing indicator, or an icon on a display; or (3) issues both an audible alert and a visible.

According to a preferred embodiment, a manual alert cancellation control is provided on the user interface to allow the user to cease the alert indicator or sound, and an automatic cancellation is performed according to a user preference alert time period value if no manual cancellation is performed.

CONCLUSION

The present invention has been disclosed in general terms as well as with specific examples and descriptive illustrations. It will be recognized by those skilled in the art that the scope of the present invention is not limited to these illustrations and examples, and that the present invention may be realized in a number of alternate forms, and used in conjunction with a wide variety of vehicle types in order to enhance the safety of their operation. Additionally, the present invention may be realized in conjunction with other types of radar systems, such as pulsed time-of-flight or pulsed Doppler systems.

Further, certain details of preferred embodiments have been described, but it will be recognized by those skilled in the art that many substitutions and variations may be made from the disclosed embodiments without departing from the spirit and scope of the invention. Therefore, the scope of the invention should be determined by the following claims.

What is claimed is:

1. A method of warning the operator of a primary vehicle of the potential collision of a closing vehicle with the primary vehicle, the closing vehicle proceeding in the same direction as the primary vehicle, said method comprising:

(a) determining the presence of a U-turn pursuit maneuver by monitoring the primary vehicle for a relatively sudden slowing of primary vehicle velocity from a first velocity to a second velocity followed by a subsequent velocity increase from the second velocity to a third velocity, wherein the third velocity is greater than or equal to the first velocity and the first velocity is greater than the second velocity;

(b) determining one or more parameters regarding the state of movement of the closing vehicle; and (c) generating an alert to the operator of the primary vehicle when the presence of a U-turn pursuit maneuver of the primary vehicle and the one or more parameters of the closing vehicle are at a predetermined status.

2. The method as defined by claim 1 wherein the one or more parameters regarding the state of movement of the closing vehicle are dependent upon the speed of the closing vehicle.

3. The method as defined by claim 1 wherein the one or more parameters regarding the state of the movement of the closing vehicle are dependent upon the distance of the closing vehicle from the primary vehicle.

4. The method as defined by claim 1 wherein said primary vehicle is selected from the group of a police cruiser, a highway patrol vehicle, a law enforcement vehicle, an ambulance, a fire response vehicle, a maintenance vehicle, and a utility vehicle.

5. The method as defined by claim 1 wherein said step of determining the presence of a U-turn pursuit maneuver is performed by a police radar unit.

6. The method as defined by claim 1 wherein said step of determining one or more parameters regarding the state of the closing vehicle is performed by a police radar unit.

7. The method as defined by claim 1 wherein said step of generating an alert to the operator of the primary vehicle comprises generating an alert via a police radar unit user interface.

8. The method as defined by claim 7 wherein said step of generating an alert via a police radar unit user interface comprises a step selected from the group of issuing an audible signal, issuing a visual indicator, and issuing both an audible signal and a visual indicator.

* * * * *